United States Patent
Vanluchene et al.

(10) Patent No.: US 12,168,313 B2
(45) Date of Patent: Dec. 17, 2024

(54) METHOD FOR PRODUCING AN ELASTOMERIC SKIN

(71) Applicant: Recticel Automobilsysteme GmbH, Köningswinter (DE)

(72) Inventors: Yvan Vanluchene, Waregem (BE); Linda Dedoncker, De Pinte (BE)

(73) Assignee: RECTICEL AUTOMOBILSYSTEME GMBH, Köningswinter (DE)

( * ) Notice: Subject to any disclaimer, the term of this patent is extended or adjusted under 35 U.S.C. 154(b) by 667 days.

(21) Appl. No.: 17/280,533

(22) PCT Filed: Sep. 25, 2019

(86) PCT No.: PCT/EP2019/075901
§ 371 (c)(1),
(2) Date: Mar. 26, 2021

(87) PCT Pub. No.: WO2020/069937
PCT Pub. Date: Apr. 9, 2020

(65) Prior Publication Data
US 2022/0032510 A1   Feb. 3, 2022

(30) Foreign Application Priority Data
Oct. 1, 2018 (EP) .................................. 18198032

(51) Int. Cl.
| | |
|---|---|
| *B29C 41/08* | (2006.01) |
| *B29C 41/00* | (2006.01) |
| *B29K 75/00* | (2006.01) |
| *B29K 105/00* | (2006.01) |
| *B29K 105/16* | (2006.01) |
| *B29L 31/30* | (2006.01) |

(52) U.S. Cl.
CPC ............ *B29C 41/08* (2013.01); *B29C 41/003* (2013.01); *B29K 2075/00* (2013.01); *B29K 2105/0032* (2013.01); *B29K 2105/16* (2013.01); *B29K 2995/0025* (2013.01); *B29L 2031/3005* (2013.01)

(58) Field of Classification Search
None
See application file for complete search history.

(56) References Cited

U.S. PATENT DOCUMENTS

| | | | |
|---|---|---|---|
| 8,262,002 B2 | 9/2012 | Vermeire et al. | |
| 8,318,259 B2 | 11/2012 | De Winter et al. | |
| 9,464,156 B2 | 10/2016 | Vanlandschoot et al. | |
| 2006/0153991 A1* | 7/2006 | Winter .................. | B05B 7/0408 264/309 |
| 2011/0241254 A1* | 10/2011 | Hardouin-Duparc ....................... | C08K 5/0041 428/323 |
| 2013/0059129 A1 | 3/2013 | Perinet | |
| 2017/0239851 A1 | 8/2017 | Vanluchene et al. | |

FOREIGN PATENT DOCUMENTS

| | | |
|---|---|---|
| EP | 0303305 A2 | 2/1989 |
| EP | 0379246 A2 | 7/1990 |
| EP | 0389014 A1 | 9/1990 |
| JP | H02178009 A | 7/1990 |
| WO | WO 2011/000957 A1 | 1/2011 |
| WO | WO 2011/023328 A1 | 3/2011 |

OTHER PUBLICATIONS

European Patent Office, Extended European Search Report for Application No. 18198032.7, dated Apr. 12, 2019, 10 pages, Germany.
International Searching Authority, International Search Report and Written Opinion for International Application No. PCT/EP2019/075901, dated Dec. 6, 2019, 13 pages, European Patent Office, Netherlands.
International Preliminary Examining Authority (IPEA), Written Opinion for International Application No. PCT/EP2019/075901, dated Oct. 8, 2020, 7 pages, European Patent Office, Germany.
International Preliminary Examining Authority (IPEA), International Preliminary Report on Patentability Chapter II, including Applicant's Nov. 5, 2020 response to IPEA's Oct. 10, 2020 Written Opinion, for International Application No. PCT/EP2019/075901, dated Dec. 2, 2020, 13 pages, European Patent Office, Germany.

* cited by examiner

Primary Examiner — Mohammad M Ameen
(74) Attorney, Agent, or Firm — Alston & Bird LLP

(57) ABSTRACT

A method for producing an elastomeric skin having visually spotted appearance may include providing a liquid skin forming composition having solid spot forming particles having a longest dimension that is at least 40 μm and spraying the liquid skin forming composition in the form of a spray of droplets onto a mold surface. The provision of solid spot forming particles that are comparable in size to the droplet size may aid in projecting the solid spot forming particles forward upon impact on the mold surface such that a percentage thereof appear visible on the front face of the elastomeric skin after demolding thereby resulting in a front face with a spotted appearance without having to use multiple liquid skin forming compositions.

13 Claims, 2 Drawing Sheets

METHOD FOR PRODUCING AN ELASTOMERIC SKIN

CROSS-REFERENCE TO RELATED APPLICATIONS

Figure 1:
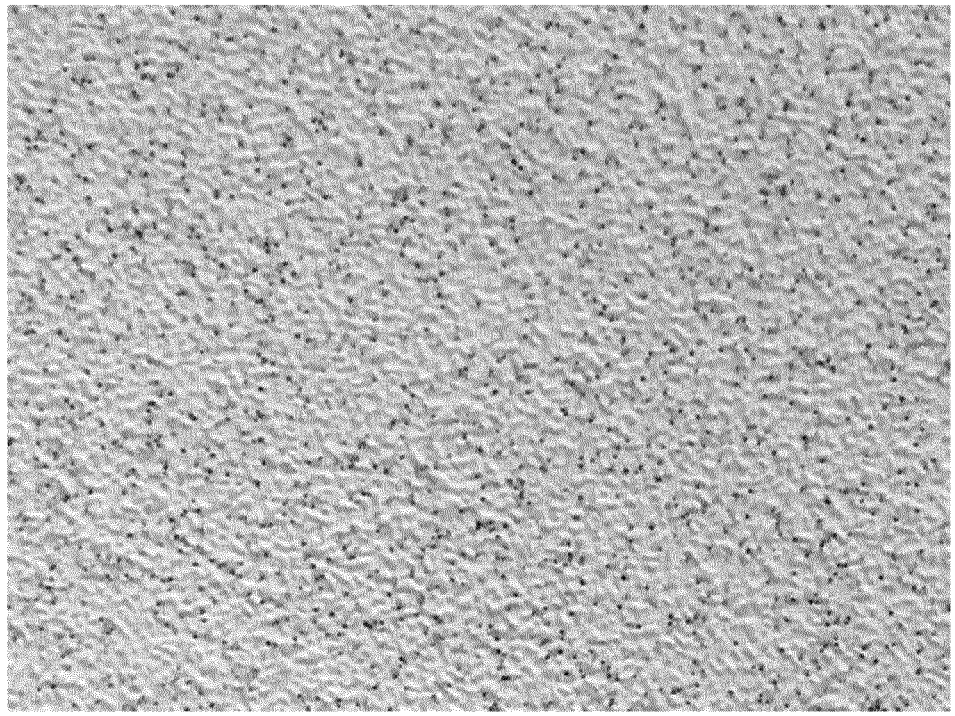

This application is a national stage application filed under 35 U.S.C. § 371 of International Application No. PCT/EP2019/075901 filed Sep. 25, 2019, which application claims priority to European Application No. EP18198032.7 filed Oct. 1, 2018, each of which is hereby incorporated by reference in its entirety.

The present invention relates to a method for producing an elastomeric skin having a visible front face produced against a mould surface, said visible front face having a visually spotted appearance.

Elastomeric skins are used as decorative surface coverings in various applications. For example, interior trim parts of automotive vehicles, such as instrument panels, dashboards, door panels, consoles, etc., are formed by a rigid substrate covered with an elastomeric skin. In such applications the elastomeric skin is adhered to the rigid substrate either directly, but preferably indirectly through the intermediary of an intermediate foam layer. This foam layer has a density which is lower than 200 kg/m$^3$ and which is usually comprised between 120 and 180 kg/m$^3$. The presence of such a foam layer enables to indent the elastomeric skin resiliently so that a soft touch is provided to the trim part. In such applications, the elastomeric skin can be made of a thermosetting material, such as polyurethane (PU). Furthermore, the elastomeric skin can show a leather texture but also other textures such as geometric textures or stipple textures, which may be obtained by spraying the thermosetting material against a grained mould surface. Alternatively, the elastomeric skin can be obtained without any texture by spraying the thermosetting material against a flat mould surface.

A known method for producing an elastomeric skin having a visually spotted appearance comprises the steps of: providing a liquid skin forming composition; spraying said liquid skin forming composition in the form of a spray of droplets onto at least a portion of said mould surface; allowing the liquid skin forming composition to harden; and removing the produced elastomeric skin from said mould surface.

Such a method is disclosed in WO-A-2011/000957 and relies on the use of two different liquid skin forming compositions which are successively sprayed onto the mould surface to produce a visually spotted elastomeric skin. Specifically, droplets of a first, light-toned, liquid skin forming composition are applied onto the mould surface, and at least a number of them are made to coalesce thereon, to form a non-continuous layer of the light-toned liquid skin forming composition onto the mould surface. This non-continuous light-toned layer comprises, in a first area of the mould surface, a plurality of gaps where the mould surface is not covered with the light-toned liquid skin forming composition. A second, darker-toned, liquid skin forming composition is applied to cover the mould surface at the location of the gaps. Depending on the mould surface area covered with the light-toned liquid skin composition, the elastomeric skin has the appearance of a light-toned background with darker-toned spots or of a dark-toned background with lighter-toned spots.

A drawback of this method is that it is very difficult to produce an elastomeric skin having the appearance that small dots are uniformly distributed over the surface thereof. This is caused by a number of effects.

First of all, in case the first liquid skin forming composition is applied to cover a very large area of the mould surface meaning that the second liquid skin forming composition will appear as spotted, the dimensions of the dots are defined by the coalescence of the first liquid skin forming composition. In practice it is impossible to control this coalescence, meaning that obtaining a desired dot size is not feasible. Furthermore, the uniformity of the dots is also directly the result of the coalescence, thus making it impossible to achieve a desired uniformity.

Secondly, in case the first liquid skin forming composition is applied to only cover a very limited area of the mould surface meaning that the first liquid skin forming composition will appear as spotted, the dimensions of the dots are directly proportional to the dimensions of the droplets that impact the mould surface. Typically, the size of the droplets is dependent on both the spray nozzle used and the pressure applied when spraying the liquid skin forming composition, the droplet size is expressed using the median volume diameter determined according to ASTM E 799-03 (2015). Typically the median volume diameter of the droplets is between 50 μm and 500 μm (see for example U.S. Pat. No. 8,262,002 B). Due to the impact, the spherical droplets become flattened meaning that their size is further increased, thus making it difficult to obtain small dots. Moreover, covering only such a limited area of the mould surface is, in practice, very difficult to achieve, especially in three-dimensional geometries where material tends to accumulate near curved zones.

Thirdly, the coalescence typically leads to a visible filament structure irrespective of the degree of covering of the first liquid skin forming composition. This filament structure forms a large scale structure which is detrimental to the noticeability of the smaller scale spotted pattern.

Another drawback of the known process is that multiple different liquid skin forming compositions need to be sprayed onto the mould surface in order to obtain the desired visual effects. This implies that multiple spraying steps are needed thereby increasing the amount of time needed to produce the elastomeric skin. Moreover, the requirement to spray multiple liquid skin forming compositions requires the use of multiple nozzles, meaning that the automated spraying system also has to switch between the various nozzles which further increases the amount of time needed to produce the elastomeric skin. Furthermore, the various nozzles also have to be cleaned to avoid that the liquid skin forming composition would harden between consecutive uses, which hardening would make the nozzle unusable.

It is an object of the present invention to provide a method for producing an elastomeric skin having a visually spotted front face which is less time-consuming and less complex.

This object is achieved according to the invention in that said liquid skin forming composition comprises solid spot forming particles having a longest dimension that is at least 40 μm.

The provision of solid spot forming particles having a longest dimension that is at least 40 μm in the liquid skin forming composition has the effect that a percentage of the solid spot forming particles is located at or close to the front face of the elastomeric skin after demoulding, i.e. after removing the produced elastomeric skin from said mould surface. Moreover, since the solid spot forming particles have such a longest dimension that these are visible with the naked eye, the solid spot forming particles at the visible surface of the elastomeric skin are also visually perceptible by the naked eye, meaning that they appear as spots surrounded by the hardened skin forming material. As such, the method according to the present invention allows to produce an elastomeric skin having a spotted appearance without requiring multiple compositions to be sprayed subsequently to one another as in the known methods. As such, the method according to the invention is less time-consuming and also less complex as it avoids having to use multiple nozzles to achieve the spotted appearance.

As used herein, the term "spot" refers to a small area of a surface that is visibly different (e.g. in colour, finish, or material) from the surrounding area of the surface.

As used herein, the term "solid spot forming particle" refers to a solid particle capable of forming a spot, which solid particle has a longest dimension that is at least 40 μm.

In an embodiment of the present invention the longest dimension of a solid spot forming particle may be determined using optical microscopy according to ISO13322-1: 2014 to find the maximal Feret diameter.

A further advantage of the elastomeric skin produced with the method according to the present invention is its abrasion resistance. In particular, the solid spot forming particles, although they are located near or even at the front face of the elastomeric skin, are still embedded in the matrix formed as part of the elastomeric skin and may even be covered by a very thin film. As such, the solid spot forming particles typically firmly adhere to the matrix meaning that they cannot easily get rubbed away from the elastomeric skin.

Furthermore, as the solid spot forming particles are directly contained in the liquid skin forming composition, they are homogenously distributed, particularly dispersed, therein, meaning that they also, on average (i.e. when considering a front face having a surface area of at least 5 cm$^2$), appear uniformly across the front face of the elastomeric skin.

Moreover, the size of the spots is directly controllable by selecting the size of the solid spot forming particles. It is therefore feasible to achieve very small dots, even as small as bordering the visually perceptible range of the naked eye which is around 40 μm.

It will be readily appreciated that the solid spot forming particles do not necessarily have to result in a different visible perception of the elastomeric skin. Instead, the solid spot forming particles could impart a special surface characteristic to the elastomeric skin, e.g. improved wetting effect of the surface, improved abrasion properties, antimicrobial behaviour, specific touch properties, etc. Although it is highly likely that the use of solid spot forming particles causing one or more of these effects would also modify the look of the elastomeric skin.

In the state of the art it is already known to suspend solid particles in a liquid composition to provide an elastomeric skin with an accentuated grain structure through the use of effect pigments. In particular, US-A-2017/239851 discloses that a first liquid composition, typically solvent- or water-based, may act as a transparent or translucent medium in which effect pigments, such as metallic or pearlescent pigments, are suspended, which pigments typically form between 10% and 20% by weight of the first liquid composition. This first liquid composition forms a coating layer that is applied in-mould. Afterwards a second liquid skin forming composition, typically a polyurethane composition, is moulded against the dried coating layer. However, the obtained elastomeric skin does not achieve a spotted appearance but rather a metallic appearance which accentuates the grain structure.

In an embodiment of the present invention said liquid skin forming composition further comprises at least one colourant such that said solid spot forming particles are contained in an opaque matrix in the produced elastomeric skin.

The opacity of the matrix ensures that a locally varying thickness of the elastomeric skin does not affect the visual effect of the solid spot forming particles as is the case in the method of US-A-2017/239851 which uses a transparent or translucent medium containing effect pigments. The uniform dispersion of the solid spot forming particles in combination with the opaqueness of the matrix is particularly suited to produce a spotted elastomeric skin on three-dimensionally shaped mould surfaces where it is practically impossible to achieve an uniform thickness of the elastomeric skin.

As used herein, the term "opaque matrix" is used to describe a matrix material which, when applied as a layer of material having an average thickness of 1 mm, transmits at most 5%, in particular at most 1%, specifically at most 0.1%, and more specifically at most 0.01% of the radiation energy of perpendicularly incoming visible sunlight according to the ASTM G173-03 (2012) standard spectrum AM1.5 global. In other words, as soon as the layer exceeds a minimum thickness threshold, it is not visually transparent, nor visually translucent. A layer of material having a thickness below the minimum thickness threshold is then typically visually translucent or even visually transparent in case the thickness becomes very small.

The average thickness of a layer of material may be determined by dividing the volume thereof by the surface area of the mould surface which is coated with this layer (not including an additional surface area provided by a texture present in the mould surface).

As used herein, the term "visually transparent" is used to describe a material that is able to transmit image-forming light in the visible spectrum. The distinctness of the image transmitted through the medium may be used as a measure of transparency.

As used herein, the term "visually translucent" is used to describe a material which, when applied as a layer having an average thickness of 1 mm, transmits at least 5% of perpendicularly incoming visible sunlight according to the ASTM G173-03 (2012) standard spectrum AM1.5 global.

In an embodiment of the present invention the liquid skin forming composition is substantially free of any solvent.

As used herein, the expression "substantially free of any solvent" means that the solvent content, relative to the total weight of the polymeric matrix medium, is lower than 0.01 wt. %, in particular lower than 0.005 wt. %, specifically lower than 0.001 wt. %, more specifically lower than 0,0005 wt. %, even more specifically lower than 0,0001 wt. %.

As used herein, the term "solvent" includes water, a water-based solvent or a non-aqueous solvent.

As used herein, the term "water-based solvent" means that the solvent comprises water.

As used herein, the term "non-aqueous solvent" refers to organic solvents which are substantially free of water.

In a preferred embodiment of the present invention said colourant comprises pigment particles of which at least 90 volume % has a longest dimension that is at most 10 μm, in particular at most 1 μm and more in particular at most 0.5 μm. The produced elastomeric skin preferably comprises between 0.01% and 10%, more preferably between 0.05% and 7% and most preferably between 0.1% and 5%, by weight of said pigment particles.

The amount of colouring of the opaque matrix, i.e. the weight percentage of the colourant, affects the opacity of the elastomeric skin. Specifically, the higher the amount of colourant, the less the solid spot forming particles are visible, because even the thinnest layer, e.g. a few microns thick, of matrix material will visibly cover the solid spot forming particles such that the spotted appearance may be partially lost. Further, as the liquid skin forming composition is substantially free of any solvent, the weight percentage of colourant in the produced elastomeric skin is nearly identical to the weight percentage thereof in the liquid skin forming composition.

In an embodiment of the present invention the median volume diameter, determined according to ASTM E 799-03 (2015), of said droplets is at least 40 µm, preferably at least 60 µm, more preferably at least 70 µm and most preferably at least 80 µm. In an embodiment of the present invention at least 50 volume %, preferably at least 90 volume %, of said solid spot forming particles have a longest dimension which is at least half the median volume diameter of said droplets determined according to ASTM E 799-03 (2015).

In both embodiments, the formed droplets are relatively small compared to the size of the solid spot forming particle, meaning that, during spraying, the shear forces caused by relative movement of the solid spot forming particles with respect to the air may separate the solid spot forming particles from the liquid skin forming material. As a result thereof, the solid spot forming particles may already substantially be separated from the droplets before impact, which aids in projecting the solid spot forming particles towards the mould surface during impact of the spray of droplets thereon.

In an embodiment of the present invention said solid spot forming particles comprise particles having a longest dimension that is at least 50 µm, preferably at least 70 µm, more preferably at least 90 µm and most preferably at least 100 µm. In an embodiment of the present invention the longest dimension of at least 75 volume %, preferably at least 90 volume %, of said solid spot forming particles, which have a longest dimension that is at least 40 µm, is at least 60 µm.

In both embodiments, the larger the solid spot forming particles, the more likely that the solid spot forming particles will be separated from the liquid skin forming material in the spray and the more they will be viewed as distinct spots on the front face of the elastomeric skin.

In an embodiment of the present invention the produced elastomeric skin comprises between 0.1% and 5%, preferably between 0.2% and 4%, more preferably between 0.3% and 2%, by weight of said solid spot forming particles (with respect to the total weight of the elastomeric skin).

It has been found that the desired visually spotted appearance may be achieved even with relatively low percentages of solid spot forming particles in the elastomeric skin.

In an embodiment of the present invention said solid spot forming particles are substantially free of particles having a longest dimension that is greater than 300 µm and in particular greater than 240 µm. In other words, at least 90 volume %, in particular at least 95 volume %, and specifically at least 99 volume % of the solid spot forming particles has a longest dimension that is smaller than 300 µm and in particular smaller than 240 µm.

It has been found that, in case the solid spot forming particles become too large, they may lead to clogging of the spray gun and/or any filters used to spray the composition onto the mould surface.

In an embodiment of the present invention the step of spraying said liquid skin forming composition comprises passing said spray of droplets over said mould surface to deposit by a first pass of said spray over the different locations of said at least a portion of said mould surface a first layer of said liquid skin forming composition in said different locations on said mould surface, said first layer preferably being a continuous layer, said first layer, formed by one single pass of said spray, having in said different locations an average thickness between 10 µm and 1000 µm, which average thickness is in particular at least 50 µm and more in particular at least 100 µm, which average thickness is in particular at most 500 µm and more in particular at most 300 µm, which average thickness is, most particularly, about 200 µm. When spraying the liquid skin forming composition onto the mould surface, it is usually sprayed in strips which overlap one another. At the locations of overlap, only the thickness of the layer produced by the first passing has to be taken into account.

In an embodiment of the present invention said solid spot forming particles essentially consist of flakes. In other words, the solid spot forming particles are relatively thin structures.

It has been found that, in the method according to the present invention, in particular when spraying a relatively thin first layer in each of the different locations of the mould surface, the solid spot forming particles are aligned to some extent with the mould surface in the sense that they are oriented with their largest surface area side substantially parallel to the mould surface, which is especially advantageous when the solid spot forming particles are flakes. An advantage of said flakes is that they occupy a relatively small volume in the elastomeric skin and therefore have only a minimal effect on the mechanical properties of the skin.

In an embodiment of the present invention said liquid skin forming composition is a curable composition, preferably a curable polyurethane based composition, in particular an aliphatic polyurethane based composition.

The present invention also relates to an elastomeric skin obtained by the method according to the invention.

It is a further object of the present invention to provide an elastomeric skin having a visually spotted appearance with smaller dots.

This further object is achieved by a spray-moulded elastomeric skin having a visible front face, said elastomeric skin comprising solid spot forming particles embedded in an opaque matrix, which solid spot forming particles have a longest dimension that is between 40 µm and 500 µm such that said visible front face has a visually spotted appearance.

The size of the spots is directly controllable by selecting the size of the solid spot forming particles. It is therefore feasible to achieve very small dots, even as small as bordering the visually perceptible range of the naked eye which is around 40 µm.

Moreover, as the elastomeric skin is spray-moulded, the solid spot forming particles may be directly contained in the liquid skin forming composition to be sprayed. Consequently, the solid spot forming particles are homogenously distributed, particularly dispersed, therein, meaning that they also appear more homogenous across the front face of the elastomeric skin.

It will be appreciated that the liquid skin forming composition may be a thermosetting and/or reactive material, such as a curable polyurethane based composition.

The invention will be further described with reference to particular embodiments and the appended figure, but the invention is not limited thereto but only by the claims. The various embodiments, although referred to as "preferred" and/or "advantageous" are to be construed as exemplary manners in which the invention may be implemented rather than as limiting the scope of the invention.

Figure 2:
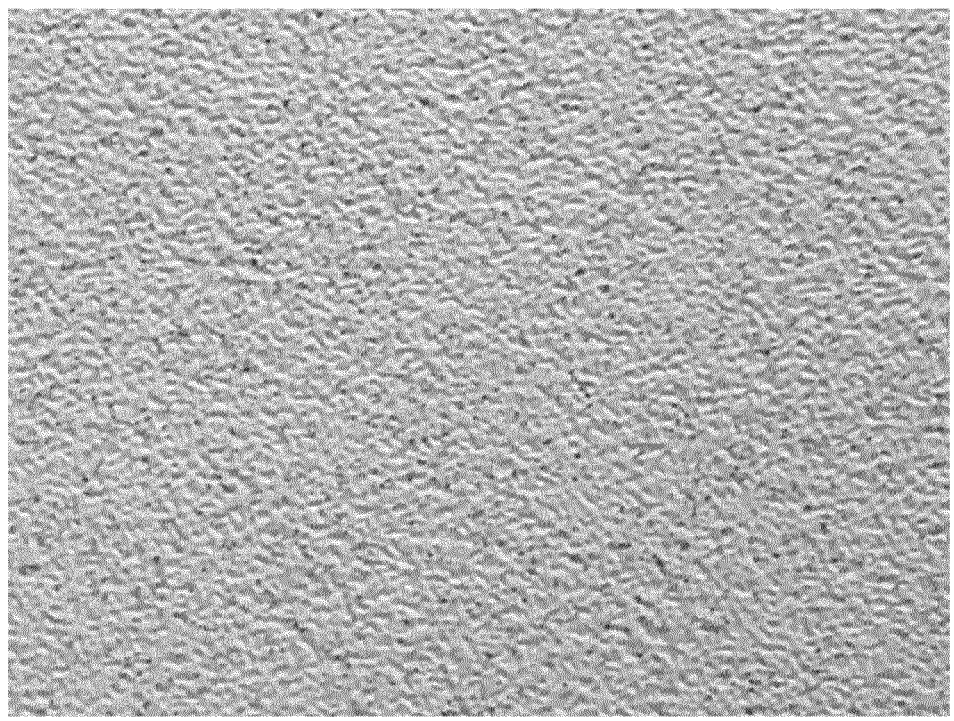
Figure 3:
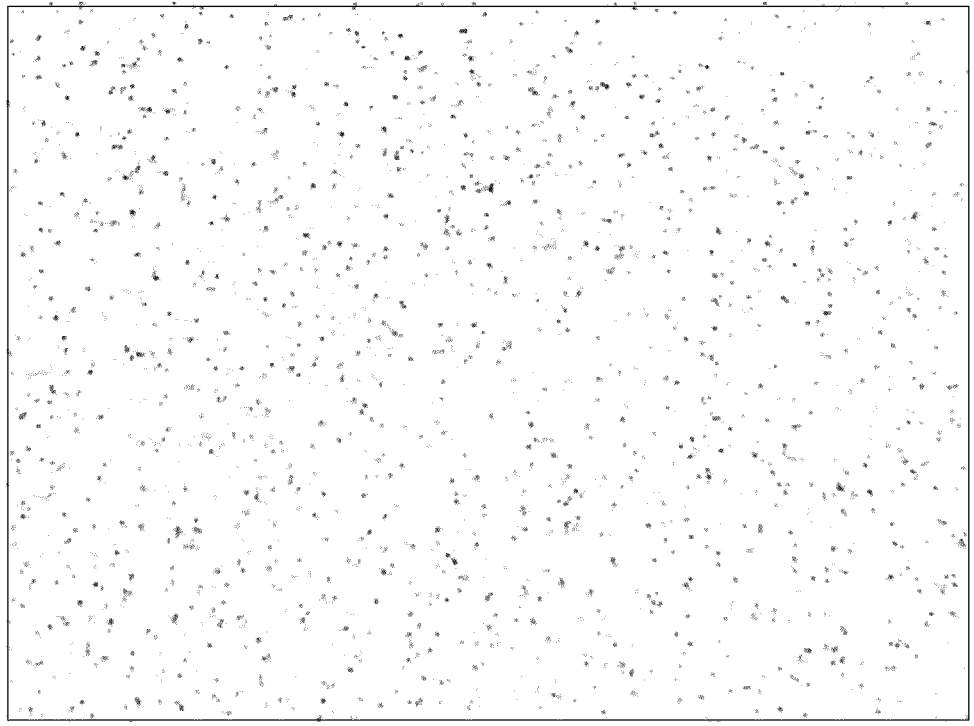
Figure 4:

FIG. 1 is a picture of the visible front face of an elastomeric polyurethane skin produced against a textured mould surface in accordance with Example 1;

FIG. 2 is a picture of the visible front face of an elastomeric polyurethane skin which is produced against the same textured mould surface in accordance with Example 2, which differs from Example 1 only by the use of a half amount of the spot forming particles; and FIGS. 3 and 4 correspond to the pictures of FIGS. 1 and 2 wherein the image properties have been modified to show substantially only the solid spot forming particles.

The elastomeric skin produced by the method of the present invention has at least a portion which comprises a matrix, in particular a polymeric matrix, in which solid spot forming particles are embedded. Next to said portion, the elastomeric skin may contain one or more further portions which have different properties such as notably a different composition, texture or colour.

The term "elastomeric" indicates that the skin, or the skin layer, has an elongation, measured in accordance with DIN/EN/ISO 527-3, of at least 30% and preferably of at least 50%. The flexural modulus of the skin or of the skin layer, measured in accordance with ASTM D790-03, is preferably smaller than 100 MPa, more preferably smaller than 75 MPa and most preferably smaller than 55 MPa or even lower than 40 MPa. Generally, the overall density of the skin is larger than 300 kg/m$^3$, preferably larger than 500 kg/m$^3$ and more preferably larger than 600 kg/m$^3$.

The elastomeric skin is formed by spraying a liquid skin forming composition onto a mould surface to form a continuous layer of the liquid skin forming composition thereon. Suitable curable polyurethane compositions, which can be sprayed onto the mould surface, are disclosed in EP-A-0 379 246 and U.S. Pat. No. 9,464,156 each of which is incorporated herein in its entirety. These compositions and the liquid skin forming composition in general contain only a very limited amount of solvents, in particular less than 5 wt. % and more particularly less than 3 wt. % and are preferably substantially free of any solvent.

Preferably, an aliphatic polyurethane composition is used to provide a light-stable elastomeric skin. This is advantageous as the elastomeric skin produced by the method of the present invention is the outermost, i.e. visible, layer of the elastomeric skin.

Advantageously, the polyurethane composition is coloured, which may be achieved through the use of colourants (e.g. liquid colourants, such as dyes, and/or pigment particles, such as titanium dioxide particles or carbon black particles). Such a colourant is preferably mixed with the polyol blend of the polyurethane composition as the polyol blend typically has a higher viscosity than the isocyanate blend, which high viscosity contributes to keeping the pigment particles in suspension. The use of a coloured polyurethane composition is beneficial as this typically leads to an elastomeric skin material that is opaque, which, as described above, is particularly suited for three-dimensionally shaped mould surfaces. The degree of opacity of the elastomeric skin is typically dependent on the weight percentage of colourant and the thickness of the layer.

It has been found that an elastomeric skin having an average thickness between 0.01 mm and 3 mm, which average thickness is in particular at least 0.1 mm, more in particular at least 0.3 mm and most in particular at least 0.7 mm, which average thickness is in particular at most 2 mm and more in particular at most 1.5 mm, which average thickness is, most particularly, about 1 mm in combination with the produced elastomeric skin comprising between 0.01% and 10%, preferably between 0.2% and 5% and more preferably between 0.3% and 2%, by weight of pigments leads to an opaque elastomeric skin.

These compositions can be sprayed for example by the techniques described in EP-A-0 303 305, in EP-A-0 389 014, in U.S. Pat. No. 8,262,002 B and in U.S. Pat. No. 8,318,259 B each of which is incorporated herein in its entirety. In this way the droplets preferably have a median volume diameter, determined according to ASTM E 799-03 (2015), that is at least 40 μm, preferably at least 60 μm, more preferably at least 70 μm and most preferably at least 80 μm and at most 500 μm, preferably at most 300 μm, more preferably at most 200 μm and most preferably at most 150 μm.

It should be appreciated that the elastomeric skin may be formed by sequentially applying the liquid skin forming composition multiple times, in subsequent layers, to increase the thickness of the elastomeric skin. Especially for three-dimensionally shaped mould surfaces, it is not always possible to achieve the required thickness of the elastomeric skin in a single layer as the liquid skin forming composition starts flowing due to gravity.

In case the colourant comprises pigment particles, it is advantageous when at least 90 volume % of the pigment particles has a longest dimension that is at most 10 μm, in particular at most 1 μm and more in particular at most 0.1 μm. In this way, the pigment particles are small compared to the spray of droplets, meaning that the pigment particles are suspended in the droplets and are thus not projected, contrary to the solid spot forming particles as described below, towards the mould surface during spraying, which projection would locally change the opacity of the elastomeric skin.

The known compositions are modified by including solid spot forming particles therein, i.e. particles that have a longest dimension that is at least 40 μm. Various types of particles may be used as spot forming particles. For example, effect pigments may be used as spot forming particles. The term effect pigments embrace both metallic pigments and nacreous or pearlescent pigments. Metallic pigments are opaque to light and reflect the incident light. They can consist for example of aluminium, titanium or copper. Pearlescent or nacreous pigments simulate the effect of natural pearl and are composed of thin platelets (i.e. flakes) which are transparent in the visible region of the spectrum.

Effect pigments are often based on platelet shaped particles (i.e. flakes). Because the optical effect is the result of multiple reflections and transmission of light, it is desirable to provide particles that will align in the medium in which they are found and to optimize the desired effect. Effect pigments, particularly pigments based on mica, have since long time been used in automotive top coats in order to achieve a coloured metallic effect, among other reasons. That metallic effect can be characterized by the flip-flop of light to dark as the viewing angle is changed. In the case of mica pigments, that flip-flop is from the reflection colour of the mica to dark.

It is also possible to use coloured particles as solid spot forming particles. These coloured particles are then differently coloured with respect to the opaque matrix of the elastomeric skin. In particular, the coloured particles have a different colour value in the CIELAB colour space, as defined by the CIE (Commission Internationale de l'Eclairage) in 1976, than the opaque matrix of the elastomeric skin. CIE L*a*b* (CIELAB) is a colour space specified by the International Commission on Illumination. The L*a*b* colour space includes all perceivable colours, and one of the most important attributes of the L*a*b* colour space is the device independency, meaning that the colours are independent of their nature of creation. The three coordinates of CIELAB represent the lightness of the colour (L*=0 yields black and L*=100 indicates diffuse white (specular white might be higher)), its position between red, magenta and green (a* negative values indicate green, while positive values indicate magenta) and its position between yellow and blue (b* negative values indicate blue and positive values indicate yellow).

The solid spot forming particles may also be glitter particles, such as glass, polyester or aluminium glitter particles. Glitter particles reflect light at different angles, causing the surface to sparkle or shimmer.

It will be readily appreciated that the solid spot forming particles may further be formed by other types of materials, such as glass beads (both filled and hollow), grinded thermoplastic materials, metal flakes, etc. Moreover, various different types of solid spot forming particles may be combined in a single elastomeric skin. However, it is essential that, in order to obtain an elastomeric skin having a visually spotted surface, these solid spot forming particles are visible with the naked eye and that they are differently coloured with respect to the opaque matrix of the elastomeric skin so that they are visibly identifiable.

Moreover, the solid spot forming particles may have a variety of shapes ranging from spherical particles to flakes, e.g. a thin hexagonal prism. It has been found that flake particles are advantageous as these have a higher surface to volume ratio when compared to spherical particles. In particular, in order to compromise the structural integrity of the elastomeric skin as little as possible, the volume of the solid spot forming particles should be as small as possible, while offering the largest visibility possible. In some embodiments, the solid spot forming particles have a volume that is at most 45%, preferably at most 35% and more preferably at most 30% of a spherical particle having a diameter that is equal to the longest dimension of the respective spot forming particle, while the surface area of the solid spot forming particles is at least 50%, preferably at least 55% and more preferably at least 60% of a spherical particle having a diameter that is equal to the longest dimension of the respective spot forming particle. This may for example be achieved by a regular hexagonal prism having a side length of 60 μm and a height of 30 μm.

Using flakes as solid spot forming particles is especially advantageous when the elastomeric skin is sprayed by multiple spray passings, each spray passing preferably forming a continuous layer on a desired portion of the mould surface. At the different locations of the mould surface where the elastomeric skin is produced against the mould surface, the skin layer created at the respective location first on the mould surface by the first spray passing over that location of the mould surface typically has an average thickness between 10 μm and 1000 μm, which average thickness is in particular at least 50 μm and more in particular at least 100 μm, which average thickness is in particular at most 500 μm and more in particular at most 300 μm, which average thickness is, most particularly, about 200 μm. It has been found that such a thin layer aids in aligning the flakes with the mould surface in the sense that they are oriented with their largest surface area side substantially parallel to the mould surface.

As for the pigment particles, it is also advantageous when the solid spot forming particles are mixed with the polyol blend of the polyurethane composition as the polyol blend typically has a higher viscosity than the isocyanate blend, which high viscosity contributes to keeping the solid spot forming particle in suspension.

In order to obtain an elastomeric skin having a visually spotted face, it has been found that the solid spot forming particles must have a longest dimension that is at least 40 μm. The longest dimension of the solid spot forming particles a Feret diameter, in particular the largest Feret diameter, that determined via optical microscopy according to ISO13322-1:2014.

In general, there is a difference in physical behaviour between a mixture of solid spot forming particles and droplets having the same order of magnitude and a mixture of solid spot forming particles and droplets where the solid spot forming particles are much smaller than the droplets and are therefore suspended in the droplets. In particular, in case the solid spot forming particles and droplets have a comparable size, when a droplet impacts the mould surface, it is broken up into a number of smaller droplets or flows out over a larger surface area so that the solid spot forming particles are deposited closer to the mould surface and thus to the visible surface of the elastomeric skin. Moreover, it is contemplated that the breaking-up of the droplets on impact also frees the spot forming particles which thus maintain a significant forward momentum compared to the broken-up droplets. This seems a plausible explanation for the observation that the produced elastomeric skins have a higher concentration of spots on the front face than on their back face. However, in case the solid spot forming particles are suspended in the droplets, the breaking-up of a droplet would only cause the suspended particles to be suspended in a smaller-sized droplet meaning that the forward momentum of the droplets and the suspended solid spot forming particles is similar.

Consequently, the selection of solid spot forming particles based on their longest dimension such that this dimension is of the same order magnitude as the typical droplet size, i.e. a longest dimension that is at least 40 μm, results in, during spraying of the liquid skin forming composition, solid spot forming particles having a significant forward momentum compared to the broken-up droplets, causing them to be projected forwards towards the mould surface. The forward projection of the solid spot forming particles increases the percentage of the solid spot forming particles that are located at the visible surface of the elastomeric skin, which visible surface corresponds to the surface of the mould. Since the solid spot forming particles are also selected to have a longest dimension such that these are visible with the naked eye, the solid spot forming particles at the visible surface of the elastomeric skin are also visually perceptible by the naked eye, meaning that they appear as spots surrounded by the hardened droplets.

Advantageously at least 50 volume %, preferably at least 90 volume %, of the solid spot forming particles has a longest dimension which is at least half the median volume diameter of said droplets. As described above, this aids in depositing the solid spot forming particles closer to the mould surface during impact of the spray of droplets thereon as the formed droplets typically cannot encapsulate a solid spot forming particle entirely.

As the visible range of the human eye is near 40 μm, it has been found that solid spot forming particles comprising particles having a longest dimension that is at least 50 μm, preferably at least 70 μm, more preferably at least 90 μm and most preferably at least 100 μm is beneficial as this increases the visibility of the spots. A similar effect is achieved by selecting the solid spot forming particles such that the longest dimension of at least 75 volume %, preferably at least 90 volume %, of thereof is at least 60 μm.

However, technical limitations of the spray gun used to spray the liquid skin forming composition on the mould surface lead to the fact that the solid spot forming particles should not have a too large size as these could clog the narrow channels of the spray gun. It has been found that this is avoided by selecting solid spot forming particles that are substantially free of particles having a longest dimension of greater than 300 μm, preferably greater than 240 μm, more preferably greater than 180 μm and most preferably greater than 150 μm. This is also avoided by reducing the percentage of large solid spot forming particles, specifically when the longest dimension of at most 25 volume %, preferably at most 10 volume %, and more preferably at most 5 volume % of said solid spot forming particles exceeds 300 μm. This may also be avoided by selecting solid spot forming particles such that at least 50 volume %, preferably at least 90 volume %, thereof have a longest dimension which is at most triple the median volume diameter of the spray of droplets.

In order not to have too many spots, i.e. to avoid that the solid spot forming particles would form a too large percentage of the visible area of the elastomeric skin, it has been found that only a limited weight percentage of the solid spot forming particles should be included. In particular, the produced elastomeric skin, and thus also the liquid skin forming composition as this is preferably substantially free of solvents, comprises between 0.1% and 10%, preferably between 0.1% and 5%, more preferably between 0.2% and 4%, and advantageously between 0.3% and 2% by weight of said solid spot forming particles.

It will be appreciated that, in some embodiments, the elastomeric skin may have a visible front face which is grained, i.e. which is provided with a texture. This texture can for example be an animal texture, in particular a leather texture, or a stipple structure, a geometric texture, etc. Preferably, the mould surface is only grained to reduce the visible glossy (shiny) appearance of the front face of the elastomeric skin. In other words, the grain structure is used to create a colour having a matt appearance. The grain depth of the textured surface, determined as the surface roughness depth (Rz) measured in accordance with DIN EN ISO 4287:1998, is generally comprised between 5 and 250 μm. This grain depth is in particular smaller than 200 μm, preferably smaller than 175 μm, more preferably smaller than 150 μm and most preferably smaller than 125 μm and/or this grain depth is in particular larger than 15 μm, preferably larger than 30 μm, more preferably larger than 40 μm and most preferably larger than 50 μm.

Such a grained surface texture may be achieved by utilizing a grained mould surface as described in US-A-2017/239851 which is incorporated herein in its entirety. The grain of this mould surface is a negative of the grain of the visible front face of the skin. The mould surface has in particular also a grain depth, determined as the surface roughness depth (Rz) measured in accordance with DIN EN ISO 4287:1998, of between 5 and 250 μm. This grain depth is preferably smaller than 200 μm, more preferably smaller than 175 μm, most preferably smaller than 150 μm and even more preferably smaller than 125 μm.

EXAMPLE

A series of elastomeric skin samples were produced according to the invention. Specifically, four elastomeric skin samples were prepared, each using a different liquid skin forming composition, in particular polyurethane formulations. Each liquid skin forming composition comprises, as component A, an aliphatic polyisocyanate, and, as component B, a polyol mixture, solid spot forming particles (i.e. flakes), and colourant in the form of pigments particles. Both the colourant and the solid spot forming particles are added to the polyol mixture. The liquid skin forming composition of the four polyurethane formulations is presented in Table 1. The black flakes in example 1, 2, and 3 are hexagonal prism-shaped polyester flakes with a longest dimension of 136 μm and a thickness of 38 μm. The white flakes in example 4 are hexagonal prism-shaped polyester flakes with a longest dimension of 101 μm and a thickness of 50 μm. The liquid compositions are sprayed in a ratio component A/component B equal to 0.54 on a grained mould surface at an output rate of 14 g/s, after which the elastomeric skins are demoulded. By spraying three successive layers the final elastomeric skins have an average thickness of 0.7 mm.

TABLE 1

Composition of the liquid polyurethane compositions used in Examples 1 to 4.

| | | example 1 | example 2 | example 3 | example 4 |
|---|---|---|---|---|---|
| component A | polyisocyanate | 58 parts | 58 parts | 58 parts | 58 parts |
| component B | polyol mixture | 102 parts | 102 parts | 102 parts | 102 parts |
| | flakes | 2 parts (black) | 1 parts (black) | 2 parts (black) | 2 parts (white) |
| | colour pigments | | | | |
| | white (colour index PW6) | 2.8 parts | 2.8 parts | 1.4 parts | — |
| | black (colour index PK7) | 0.03 parts | 0.03 parts | 0.015 parts | 0.25 parts |
| | yellow (colour index PBr24) | 0.21 parts | 0.21 parts | 0.10 parts | — |
| | brown (colour index PR101) | 0.04 parts | 0.04 parts | 0.02 parts | — |

The elastomeric skins of examples 1, 2, and 3 show a black spotted beige coloured surface. The elastomeric skin of example 2 shows a less spotted effect when compared to example 1 due to the lower concentration of flakes. The black spotted effect is most visible in the elastomeric skin of example 3 since the ratio of flakes and colour pigment loading is highest meaning that flakes which are covered with a very thin layer of polyurethane are still visible thus increasing the spotted effect. The elastomeric skin of example 4 shows a white spotted black coloured surface. A microscopic analysis of the elastomeric skin surface indicates the contrasting colour of the white hexagonal flakes which are aligned with the skin surface. A picture of the skin produced in Example 1 is shown in FIG. 1 whilst a picture of the skin produced in Example 2 is shown in FIG. 2. FIGS. 3 and 4 show the pictures of FIGS. 1 and 2, respectively, the image properties of the pictures shown in FIGS. 3 and 4 having been modified to eliminate the effect of the texture and to show thereby only the solid spot forming particles.

The invention claimed is:
1. A method for producing an elastomeric skin having a visible front face produced against a mould surface, said visible front face having a visually spotted appearance, the method comprising the steps of:
   providing a liquid skin forming composition;

spraying said liquid skin forming composition in the form of a spray of droplets onto at least a portion of said mould surface;

allowing the liquid skin forming composition to harden; and removing the produced elastomeric skin from said mould surface, wherein said liquid skin forming composition comprises between 0.1 weight % and 5 weight % solid spot forming particles which consist essentially of flakes and which have a longest dimension that is between 40 μm and 500 μm, and wherein at least 50 volume % of said solid spot forming particles have a longest dimension which is at least half the median volume diameter of said droplets determined according to ASTM E 799-03 (2015).

2. The method according to claim 1, wherein said liquid skin forming composition further comprises at least one colourant such that said solid spot forming particles are contained in an opaque matrix in the produced elastomeric skin.

3. The method according to claim 2, wherein said colourant comprises pigment particles of which at least 90 volume % has a longest dimension that is at most 10 μm.

4. The method according to claim 3, wherein the produced elastomeric skin comprises between 0.01% and 10% by weight of said pigment particles.

5. The method according to claim 2, wherein said solid spot forming particles are differently coloured with respect to said opaque matrix.

6. The method according to claim 1, wherein the median volume diameter, determined according to ASTM E 799-03 (2015), of said droplets is at least 40 μm.

7. The method according to claim 1, wherein at least 90 volume % of said solid spot forming particles have a longest dimension which is at least half the median volume diameter of said droplets determined according to ASTM E 799-03 (2015).

8. The method according to claim 1, wherein said solid spot forming particles comprise particles having a longest dimension that is at least 50 μm.

9. The method according to claim 1, wherein the longest dimension of at least 75 volume % of said solid spot forming particles, which have a longest dimension that is at least 40 μm, is at least 60 μm.

10. The method according to claim 1, wherein the produced elastomeric skin comprises between 0.2% and 4% by weight of said solid spot forming particles which have a longest dimension that is at least equal to 40 μm.

11. The method according to claim 1, wherein said solid spot forming particles are substantially free of particles having a longest dimension of greater than 300 μm.

12. The method according to claim 1, wherein the step of spraying said liquid skin forming composition comprises passing said spray of droplets over said mould surface to deposit by a first pass of said spray over the different locations of said at least a portion of said mould surface a first layer of said liquid skin forming composition in said different locations on said mould surface, said first layer, formed by one single pass of said spray, having in said different locations an average thickness between 10 μm and 1000 μm.

13. The method according to claim 1, wherein said liquid skin forming composition is a curable polyurethane based composition.

* * * * *